US009183528B2

(12) United States Patent
Gemmell et al.

(10) Patent No.: US 9,183,528 B2
(45) Date of Patent: Nov. 10, 2015

(54) GENERATING A COMPLIANCE DATA MODEL FOR IT CONTROL

(75) Inventors: Thomas Pitcairn Gemmell, Woddinville, WA (US); Gaurav Kapila, Redmond, WA (US); Bahadir B. Onalan, Bellevue, WA (US); Ashvinkumar J. Sanghvi, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 917 days.

(21) Appl. No.: 13/268,725

(22) Filed: Oct. 7, 2011

(65) Prior Publication Data

US 2013/0091486 A1 Apr. 11, 2013

(51) Int. Cl.
G06F 9/44 (2006.01)
G06Q 10/06 (2012.01)

(52) U.S. Cl.
CPC .............. *G06Q 10/0639* (2013.01); *G06F 8/10* (2013.01)

(58) Field of Classification Search
CPC .................................................... G06F 8/10
USPC ........................................................ 717/104
See application file for complete search history.

(56) References Cited

U.S. PATENT DOCUMENTS

| 7,496,552 | B2  |   | 2/2009 | Huang et al.   |         |
|-----------|-----|---|--------|----------------|---------|
| 7,885,943 | B1  | * | 2/2011 | Yehuda et al.  | 707/694 |
| 2007/0094202 | A1 | * | 4/2007 | Huang et al.   | 706/47 |
| 2007/0112847 | A1 | * | 5/2007 | Dublish et al. | 707/103 R |
| 2007/0203718 | A1 |   | 8/2007 | Merrifield, Jr. | |
| 2009/0112939 | A1 |   | 4/2009 | Sanghvi et al. | |
| 2009/0198534 | A1 |   | 8/2009 | Brown et al.   | |
| 2011/0126047 | A1 |   | 5/2011 | Anderson et al. | |

OTHER PUBLICATIONS

"Compliance Field Guide", Retrieved at <<https://www4.symantec.com/mkitginfo/RSA_2011/ComplianceFieldGuide_Jan11.pdf>>, Retrieved Date: Jun. 13, 2011, pp. 31.

(Continued)

*Primary Examiner* — Wei Zhen
*Assistant Examiner* — Lanny Ung
(74) *Attorney, Agent, or Firm* — Brian Haslam; Kate Drakos; Micky Minhas (57) ABSTRACT

Techniques are described herein that are capable of generating a compliance data model for information technology (IT) control. The compliance data model is capable of capturing data from technologies (e.g., software programs, file systems, etc.) and/or developers of those technologies for determining compliance of the technologies with regulations. The compliance data model may be used to automate generation of artifacts. Each artifact is machine-readable code that includes instructions regarding how to implement a control. A control is a software container that is associated with one or more elements, such as a control objective, a control activity, a control activity test, etc. The artifacts are usable by management systems to obtain data regarding installed technologies, settings of the technologies, configurations of the technologies, events that are being utilized by the technologies, etc. The management systems may use the data to generate reports regarding compliance of the technologies with the regulations.

20 Claims, 5 Drawing Sheets

(56) References Cited

OTHER PUBLICATIONS

Bell, Greg., "Leveraging Information Technology to Enhance Compliance Efforts", Retrieved at <<http://www.kpmginstitutes.com/404-institute/insights/2010/pdf/leveraging-it-info-brief.pdf>>, Mar. 25, 2010, pp. 2.

Kim, et al., "Information Security and Multi-Compliance: Avoiding Audit Fatigue with a Single IT Compliance Strategy", Retrieved at <<http://www.akeydor.com/Admin/Public/DWSDownload.aspx?File=%2FFiles%2FFiler%2FTripwire+files%2FTripwire+Material+for+Resources%2FWhite+Papers%2FTripwire_Prescriptive_Guide_Multi_Compliance.pdf>>, Retrieved Date: Jun. 13, 2011, pp. 19.

* cited by examiner

GENERATING A COMPLIANCE DATA MODEL FOR IT CONTROL

BACKGROUND

Organizations often expend substantial resources to manually determine a state of compliance of their assets (e.g., information, technology, processes, people, etc.) in pursuit of their goals and mission. For instance, organizations often use human developers to manually perform operations, such as (1) interpreting authority documents (e.g., SoX, PCI, and other regulations) to determine controls that are applicable to an asset; (2) interpreting whether a control applies to an asset; (3) determining how to apply the control to targeted assets; (4) determining how to test integrity of an application of the control; and (5) generating test results to validate proper implementation of the control. Accordingly, substantial time, manual effort, and hard-learned expertise regarding compliant use of the organization's information technology (IT) environment is traditionally used to determine the state of compliance.

Developers traditionally expend substantial effort to extract knowledge from technology because the developers lack guidance and face a vast unstructured body of data to find, interpret in a control context, and stay abreast of as technology, practices, and authority documents evolve. The manual aspect of conventional techniques for determining compliance often causes such techniques to be relatively inefficient. Moreover, conventional techniques typically determine compliance one authority document at a time, leading to further inefficiency. Furthermore, the inefficiencies of conventional techniques are often compounded by relatively high error rates, trial failures, expensive experts to assist in performing the compliance techniques, and/or multiple iterations to successfully implement such techniques.

SUMMARY

Various approaches are described herein for, among other things, generating a compliance data model for information technology (IT) control. A method is described in which controls are generated based on regulations. Each control corresponds to a respective subset of the regulations. A subset of the controls that is applicable to a software technology is automatically determined based on first answers that correspond to first questions regarding intended use and implementation of the software technology. Each control in the subset of controls is associated with a control objective, a control activity, and a control activity test. A compliance data model regarding the software technology is automatically generated. The compliance data model specifies at least the control objective and the control activity test for each control in the subset of the controls.

A system is described that includes control logic, subset logic, and modeling logic. The control logic is configured to generate controls based on regulations. Each control corresponds to a respective subset of the regulations. The subset logic is configured to automatically determine a subset of the controls that is applicable to a software technology based on first answers that correspond to first questions regarding intended use and implementation of the software technology. Each control in the subset of the controls is associated with a control objective, a control activity, and a control activity test. The modeling logic is configured to automatically generate a compliance data model regarding the software technology. The compliance data model specifies at least the control objective and the control activity test for each control in the subset of the controls.

A computer program product is described that includes a computer-readable medium having computer program logic recorded thereon for enabling a processor-based system to generate a compliance data model for IT control. The computer program product includes first, second, and third program logic modules. The first program logic module is for enabling the processor-based system to generate controls based on regulations. Each control corresponds to a respective subset of the regulations. The second program logic module is for enabling the processor-based system to automatically determine a subset of the controls that is applicable to a software technology based on first answers that correspond to first questions regarding intended use and implementation of the software technology. Each control in the subset of the controls is associated with a control objective, a control activity, and a control activity test. The third program logic module is for enabling the processor-based system to automatically generate a compliance data model regarding the software technology. The compliance data model specifies at least the control objective and the control activity test for each control in the subset of the controls.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of generating a compliance data model for information technology (IT) control. The compliance data model is capable of capturing data from technologies (e.g., software programs, file systems, etc.) and/or developers of those technologies for determining compliance of the technologies with regulations. For instance, a technology may be a product or one or more features within a product. The compliance data model may be used to automate generation of artifacts. Each artifact is machine-readable code (e.g., an extensible markup language (XML) file) that includes instructions regarding how to implement a control. A control is a software container that is associated with one or more elements, such as a control objective, a control activity, a control activity test, etc. A control objective specifies one or more criteria that are to be satisfied for compliance with one or more of the regulations. A control activity includes instructions that specify a manner in which satisfaction of the one or more criteria are to be satisfied. A control activity test includes instructions that specify a manner in which verification of satisfaction of the one or more criteria is to be performed. The artifacts are usable by management systems to obtain data regarding installed technologies, settings of the technologies, configurations of the technologies, events that are being utilized by the technologies, etc. The management systems may use the data to generate reports regarding compliance of the technologies with the regulations. Some examples of a management system include but are not limited to System Center Operations Manager™ (SCOM) and System Center Configuration Manager™ (SCCM), each of which is developed by Microsoft Corporation.

Example techniques described herein have a variety of benefits as compared to conventional techniques for determining compliance of technologies with regulations. The example techniques may consume less time and/or fewer resources than the conventional techniques. For instance, example techniques may be capable of automating operations, including but not limited to interpreting authority documents to determine controls that are applicable to a technology; interpreting whether a control applies to the technology; determining how to apply the control to the technology; determining how to test integrity of an application of the control; generating test results to validate proper implementation of the control; generating artifacts for consumption by management systems; and transforming the artifacts into formats that are compatible with the respective management systems. The example techniques may be capable of gathering knowledge in accordance with such operations at a pace that is sufficient to keep up with the growing complexity of the technology. Data pertaining to the various authority documents may be gathered at once, rather than gathering data for one authority document at a time. The example techniques may be capable of generating artifacts that are human-readable. For instance, such human-readable artifacts may be generated for use by customers, auditors, and/or partners such as independent software vendors and system integrators.

Figure 1:
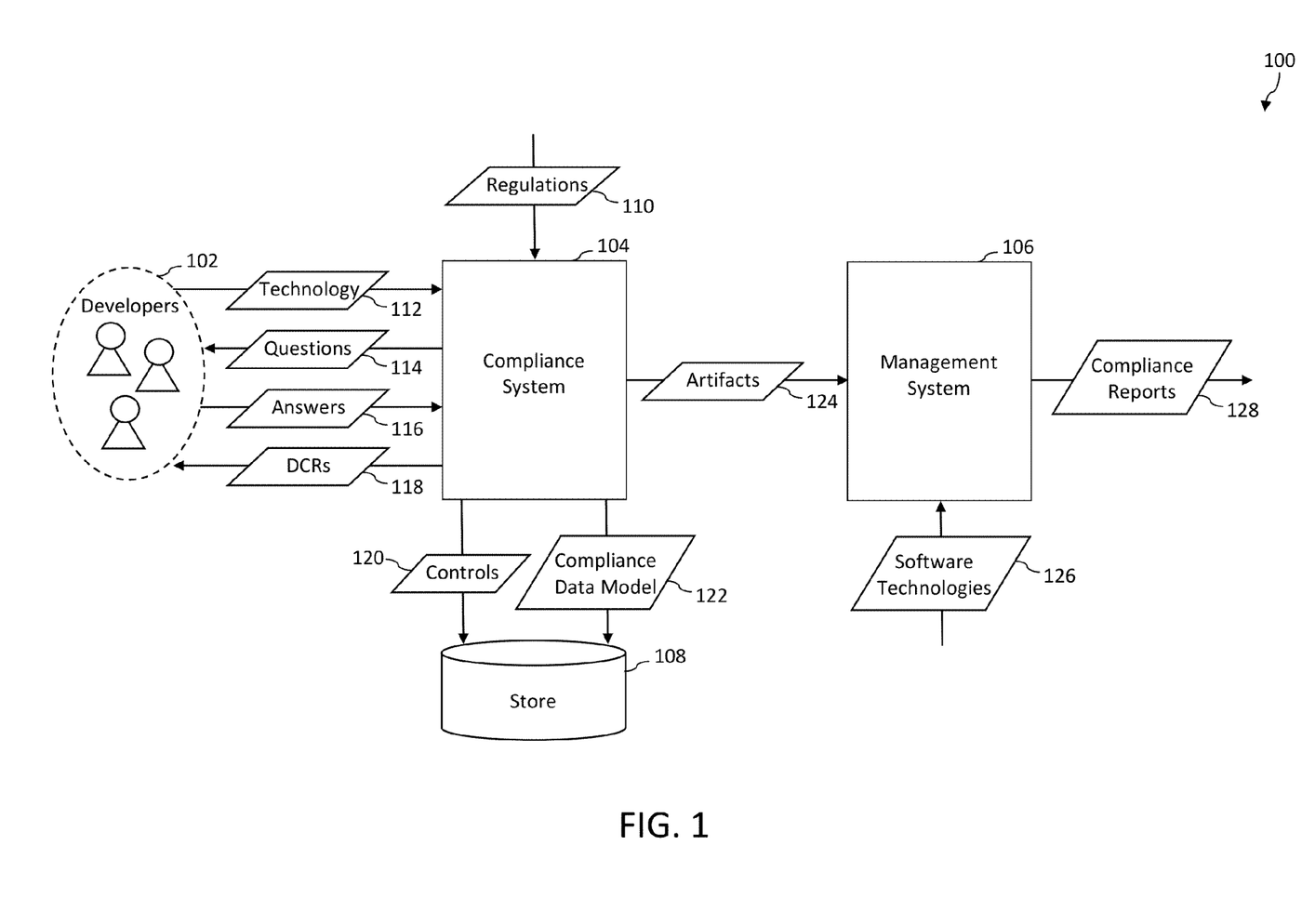
FIG. 1 is a block diagram of an example technology development system in accordance with an embodiment.

FIG. 1 is a block diagram of an example technology development system 100 in accordance with an embodiment. Generally speaking, technology development system 100 serves as a platform on which technologies (e.g., software programs, file systems, etc.) may be developed, tested, and/or monitored for compliance with regulations. Technology development system 100 includes compliance system 104, management system 106, and store 108. Developers 102 are shown in FIG. 1 merely to illustrate their interaction with technology development system 100. It will be recognized that technology development system 100 need not include developers 102.

Compliance system 104 is a processing system that is capable of generating a compliance data model, such as compliance data model 122. An example of a processing system is a system that includes at least one processor that is capable of manipulating data in accordance with a set of instructions. For instance, a processing system may be a computer (e.g., a desktop computer, a laptop computer, a tablet computer, etc.), a personal digital assistant, a cellular telephone, etc.

Compliance system 104 performs a variety of operations in order to generate the compliance data model 122. For instance, compliance system 104 generates controls 120 based on regulations 110. Each of the regulations 110 corresponds to a respective type of control. Compliance system 104 identifies the types of controls based on the regulations 110 and generates the controls 120 to be the identified types. Each of the controls is associated with a respective set of one or more elements, which may include but are not limited to a control objective, a respective control activity, a respective control activity test, etc.

Compliance system 104 then determines which of the controls 120 are applicable to a technology 112. To this end, compliance system 104 provides questions 114 to developers 102 regarding intended use and implementation of the technology 112. Compliance system 104 receives answers 116 in response to the questions 114. The answers 116 may be in machine-readable form, for example. Compliance system 104 determines a subset of the controls 120 that is applicable to the technology 112 based on the answers 116.

It will be recognized that the questions 114 or a portion thereof may be provided to one or more systems (e.g., processing systems) in addition to or in lieu of developers 102. Moreover, the answers 116 or a portion thereof may be received from such system(s) in addition to or in lieu of developers 102. It will be further recognized that the questions 114 or a portion thereof may be provided by management system 106 rather than compliance system 104. Moreover, the answers 116 or a portion thereof may be received by management system 106 rather than compliance system 104. For instance, management system 106 may use operations manager management pack(s) to determine how availability of software technologies 126 is defined. Any one or more of the answers 116 may be machine-readable and/or human-readable.

Compliance system 104 automatically generates the compliance data model 122 to specify at least the control objective and the control activity test for each control in the subset of the controls 120. Compliance system 104 may also generate artifacts 124 that define how the technology 112 is to be executed for compliance with the regulations 110. Some example techniques for generating a compliance data model for IT control are described below with reference to FIGS. 2 and 3.

Management system 106 is a processing system that is capable of monitoring execution of software technologies 126, which may include technology 112, for example. Management system 106 may provide various types of functionality. For example, management system 106 may be configured to include a configuration manager, which may provide functionality including but not limited to remote control, patch management, software distribution, operating system deployment, network access protection, and/or hardware and/or software inventory. In another example, management system 106 may be configured to include an operations manager, which may perform operations including but not limited to determining state, health, and/or performance information regarding a computer system; monitoring events and/or alerts that are generated by software technologies, such as the software technologies 126, that are executed on the computer system, etc. In accordance with example embodiments, management system 106 is configured to determine whether the software technologies 126 comply with the regulations 110 based on the artifacts 124. Management system 106 generates compliance reports 128, which include information regarding compliance of the software technologies 126 with the regulations 110. For instance, the compliance reports 128 may specify aspects of the software technologies 126 that do not comply with the regulations 110 and/or which of the regulations 110 are not satisfied by the software technologies 126.

Store 108 stores information that is used for determining compliance of the technology 112 with the regulations 110. Store 108 is shown in FIG. 1 to store the controls 120 and the compliance data model 122, though the scope of the example embodiments is not limited in this respect. For instance, it will be recognized that store 108 may store the artifacts 124 and/or the compliance reports 128 in addition to or in lieu of one or more of the controls 120 and/or the compliance data model 122. Store 108 may be any suitable type of store. One type of store is a database. For instance, store 108 may be a relational database, an entity-relationship database, an object database, an object relational database, an extensible markup language (XML) database, etc.

Compliance system 104 may be implemented in various ways to generate a compliance data model for IT control, including being implemented in hardware, software, firmware, or any combination thereof. For example, compliance system 104 may be implemented as computer program code configured to be executed in one or more processors. In another example, compliance system 104 may be implemented as hardware logic/electrical circuitry. In an embodiment, compliance system 104 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2A:
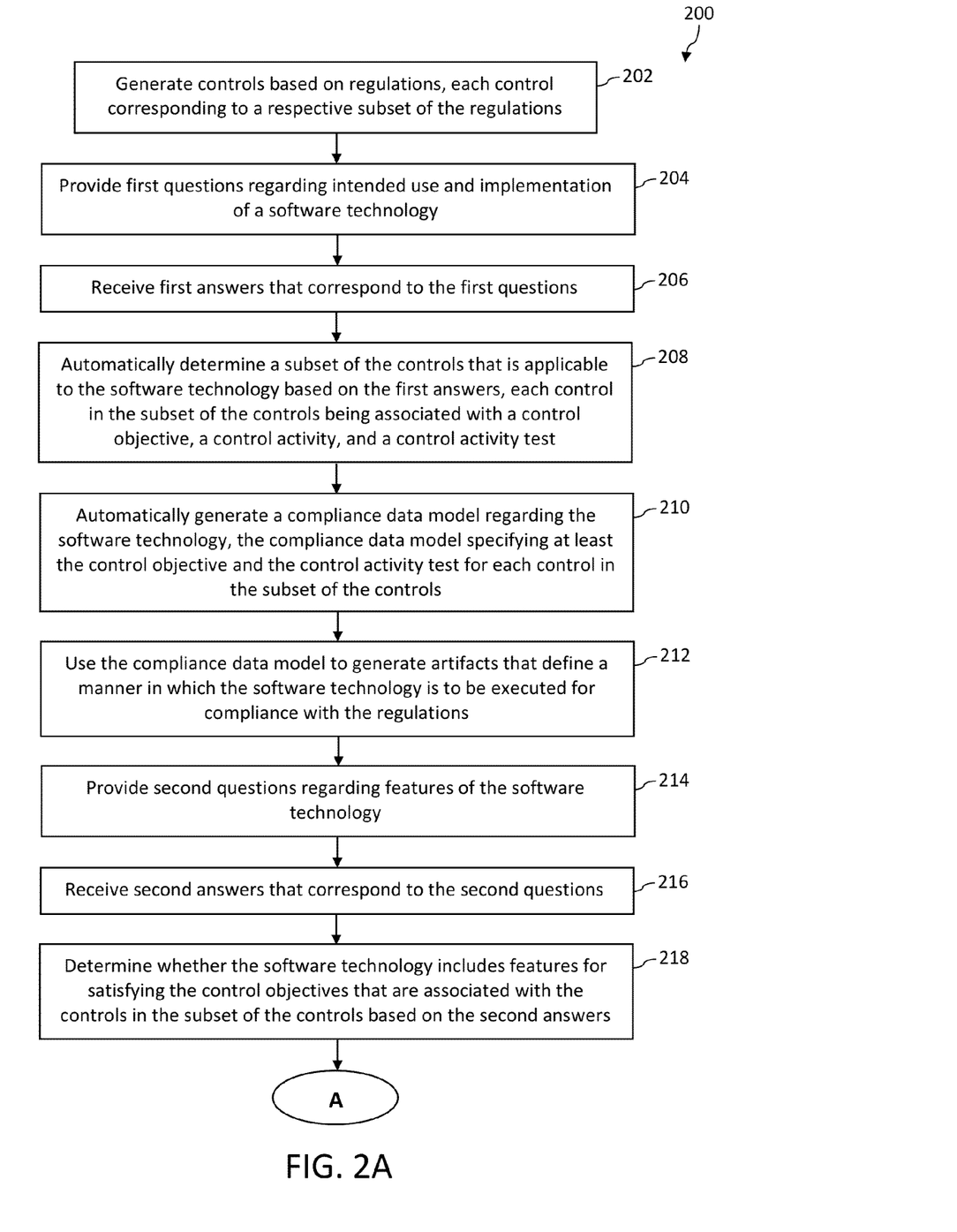
FIGS. 2A and 2B depict respective portions of a flowchart of an example method for generating a compliance data model for IT control in accordance with an embodiment.
Figure 2B:
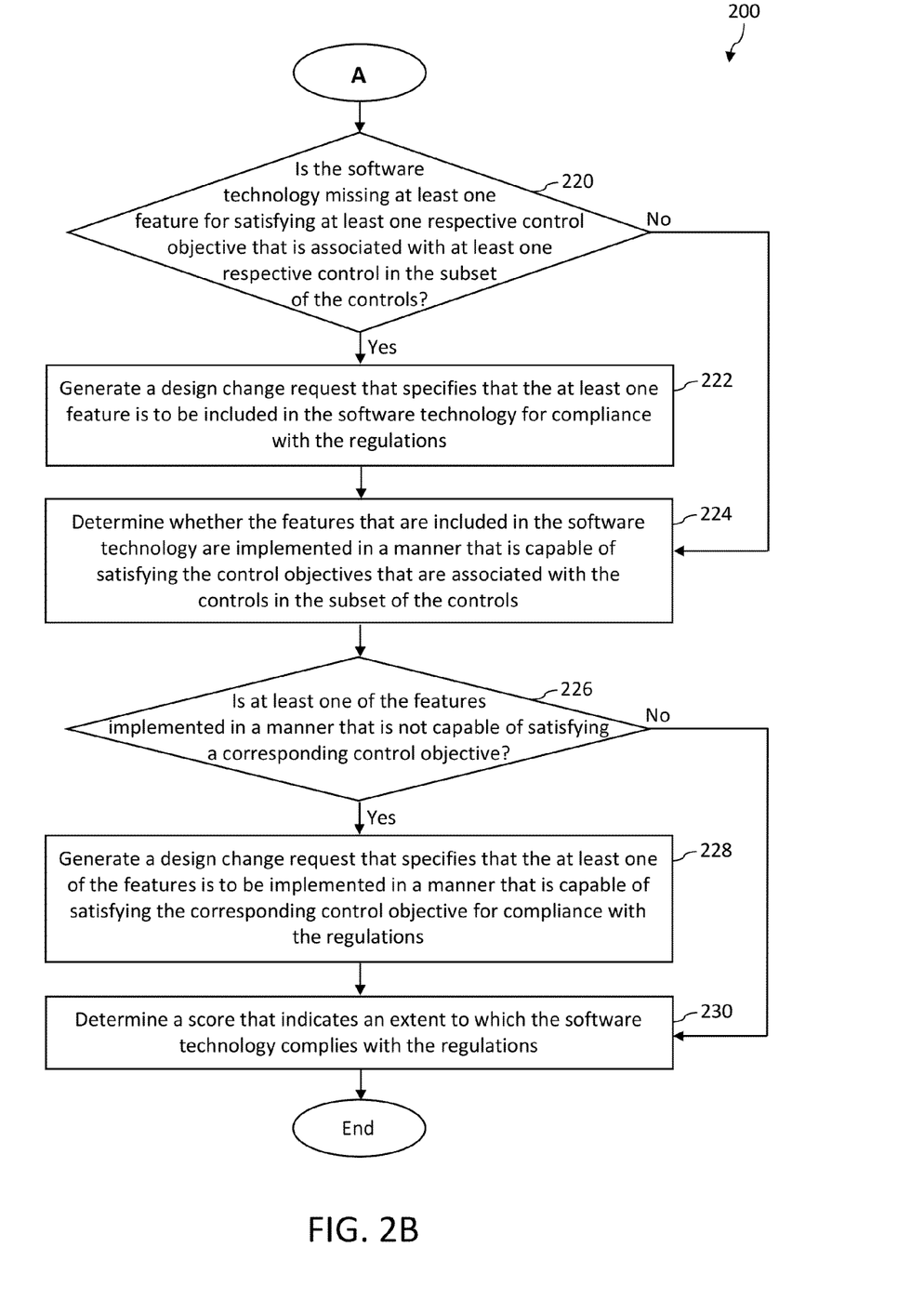
Figure 3:
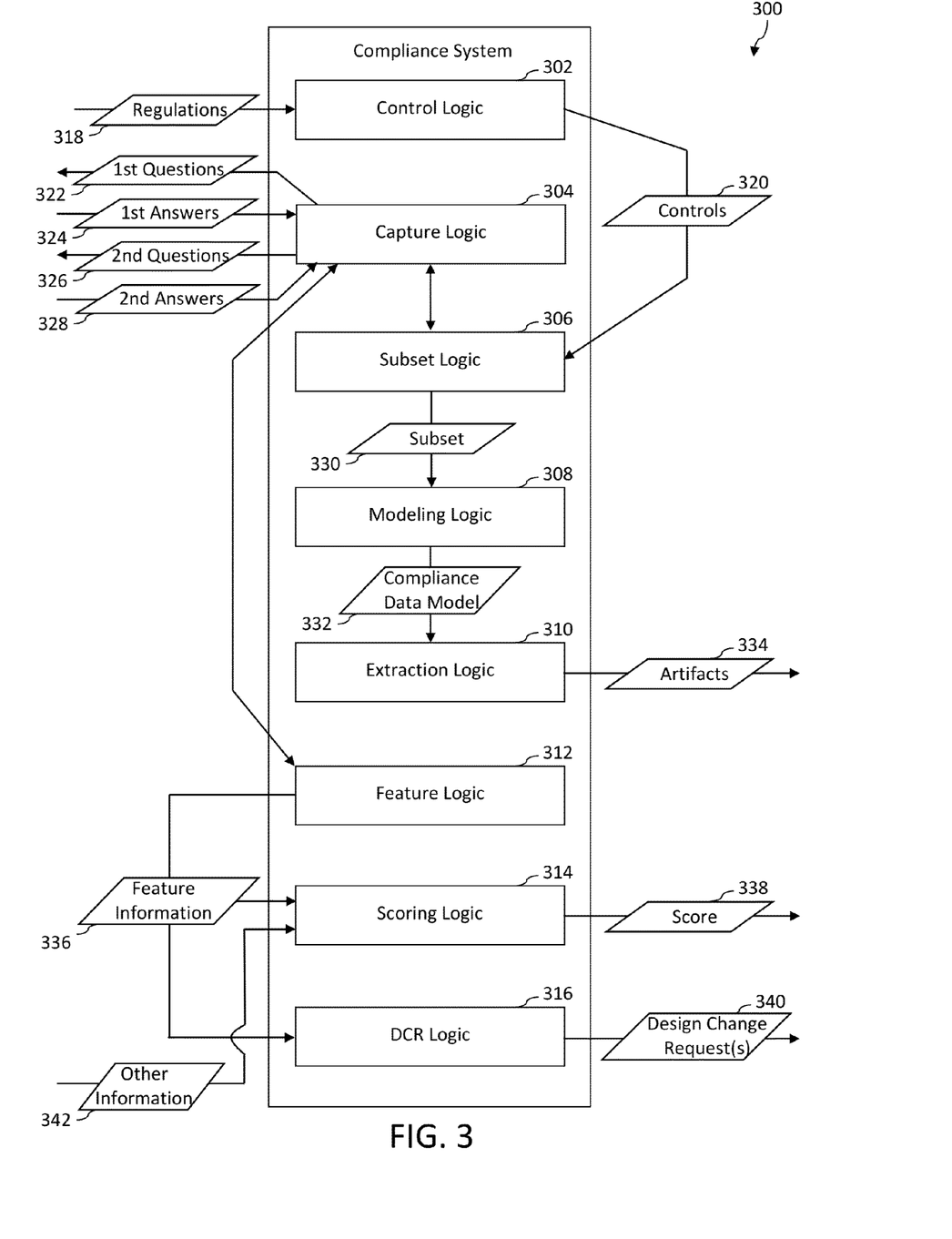
FIG. 3 is a block diagram of an example implementation of a compliance system shown in FIG. 1 in accordance with an embodiment.

FIGS. 2A and 2B depict respective portions of a flowchart 200 of an example method for generating a compliance data model for IT control in accordance with an embodiment. Flowchart 200 may be performed by compliance system 104 of technology development system 100 shown in FIG. 1, for example. For illustrative purposes, flowchart 200 is described with respect to a compliance system 300 shown in FIG. 3, which is an example of a compliance system 104, according to an embodiment. As shown in FIG. 3, compliance system 300 includes control logic 302, capture logic 304, subset logic 306, modeling logic 308, extraction logic 310, feature logic 312, scoring logic 314, and design change request (DCR) logic 316. Further structural and operational embodiments will be apparent to persons skilled in the relevant art(s) based on the discussion regarding flowchart 200.

As shown in FIG. 2A, the method of flowchart 200 begins at step 202. In step 202, controls are generated based on regulations. Each control corresponds to a respective subset of the regulations. In an example implementation, control logic 302 generates controls 320 based on regulations 318, such that each of the controls 320 corresponds to a respective subset of the regulations 318.

At step 204, first questions regarding intended use and implementation of a software technology are provided. Examples of an intended use include but are not limited to managing an IT environment or designated aspect(s) thereof (e.g., computers; software; verticals, such as financial services, entertainment, travel, sports, etc.), sharing documentation, etc. An implementation of the software technology may include architecture choices (e.g., piggy-backing on another software technology's implementation of compliance features), for example. The first questions may be provided to developer(s), system(s), etc., or any combination thereof. In an example implementation, capture logic 304 provides first questions 322, which inquire about intended use and implementation of the software technology.

Examples of questions that may be included in the first questions include but are not limited to the following: What does the software technology do for the end user? Was the software technology developed to use standard logs (e.g., standard with respect to the logging system of Microsoft Windows®) or customized logs? Does the software technology store its own passwords, or does it use crypto application programming interfaces (APIs)? Does the software technology configure its own files, or does it use registry keys? Depending on first answers, which are discussed below with reference to step 206, more questions may be provided in the first questions. For instance, if the first answers indicate that the software technology uses standard logs, crypto APIs, and registry keys, no further questions may be provided in the first questions regarding the control at issue because compliance may have been established with regard to these aspects based on other controls upon which the control at issue depends. However, if the first answers indicate that the software technology configures its own files, for example, questions regarding fifteen other controls may be provided in the first questions. Such questions may include: Are the logs secure? Does an event indicate when the logs are getting full? Is the software technology configured to indicate whether the logs have been tampered with or dated?

At step 206, first answers are received that correspond to the first questions. The first answers may be received from developer(s), system(s), etc., or any combination thereof. The first answers may be captured and stored in a manner that is agnostic with respect to a type of extraction logic (e.g., extraction logic 310) that is used to generate the artifacts, though the scope of the example embodiments is not limited in this respect. Each of the first answers may be machine-readable and/or human-readable. In an example implementation, capture logic 304 receives first answers 324 in response to the first questions 322.

At step 208, a subset of the controls that is applicable to the software technology is automatically determined based on the first answers. Each control in the subset of the controls is associated with a control objective that specifies one or more criteria that are to be satisfied for compliance with the respective subset of the regulations, a control activity that includes instructions that specify a manner in which satisfaction of the one or more criteria that are specified by the corresponding control objective are to be satisfied, and a control activity test that includes instructions that specify a manner in which verification of satisfaction of the one or more criteria that are specified by the corresponding control objective is to be performed. In an example implementation, subset logic 306 automatically determines a subset 330 of the controls 320 that is applicable to the software technology based on the first answers 324.

Multiple instances of a common control may be included in the controls. The subset of the controls may be automatically determined to include a single instance of the common control selected from the multiple instances.

Control objectives may specify any suitable criteria. For example, a control objective may specify that a password is to be a "strong" password. In accordance with this example, the same control objective or one or more other control objectives may specify that a length of the password is to be eight or more characters, the password is to includes at least one letter and at least one number, the password is to include at least one upper case letter and at least one lower case letter, the password is not to be repeated within a specified number (e.g., 13, 20, or 40) of iterations of the password, the password is to expire within a specified time period (e.g., one month, six weeks, or one year). These criteria are provided for illustrative purposes and are not intended to be limiting.

At step 210, a compliance data model regarding the software technology is automatically generated. The compliance data model specifies at least the control objective and the control activity test for each control in the subset of the controls. The compliance data model may be management system-agnostic, though the scope of the example embodiments is not limited in this respect. For example, the state of the compliance data model may not be specific to any particular management system. In accordance with this example, the first questions need not be provided (e.g., asked) again if a management system that is to utilize the compliance data model is changed. In an example implementation, modeling logic 308 automatically generates compliance data model 332.

In accordance with an example embodiment, the first answers are arranged in a human-readable report that includes multiple rows of data, such that each row represents a portion of the first answers that corresponds to a respective control in the subset of the controls that is applicable to the software technology. In accordance with this embodiment, the compliance data model is automatically generated to include machine-readable code to represent each row of the human-readable report. It will be recognized that the compliance data model may include human-readable information in addition to the machine-readable code. For example, the compliance data model may include human-readable information to correspond to each row of the human-readable report. In accordance with this example, a management system may use the machine-readable code to execute procedures that are specified in the human-readable information.

In accordance with another example embodiment, the compliance data model defines containment and schematization of objects, artifacts, and instructions for creation, application, execution, monitoring, and/or operation of control over IT services. The compliance data model may be capable of accommodating arbitrary (e.g., non-pre-defined) forms of instrumentation and methods of verifying that a control objective is met (e.g., by default) based on any of a variety of criteria. Such criteria may include but are not limited to a verifiable configuration setting, absence or presence of an audit event, a fingerprint of a specified deployment topology, a report that a management system generates, etc. In one example, the compliance data model may include a pointer to a white paper, which may specify steps to be taken for compliance with a regulation. In accordance with this example, a human may perform the steps and provide an indication that the steps have been taken. The compliance model may retrieve the indication for further processing in accordance with the techniques described herein.

For purposes of illustration, a compliance data model may specify that the model pertains to Microsoft Exchange Server® 2010 and that the model requires twenty control objectives to be satisfied. The first control objective may indicate that a registry key is to have a specified value. The second control objective may indicate that a specified event is to be absent when Microsoft Exchange Server® 2010 runs, and so on.

At step 212, the compliance data model is used to generate artifacts that define a manner in which the software technology is to be executed for compliance with the regulations. Each artifact is machine-readable code that includes instructions regarding how to implement a control. For instance, an artifact may be an extensible markup language (XML) file, a management pack, etc. A manner in which the artifacts are generated may be dependent upon a management system that is to utilize the artifacts, though the scope of the example embodiments is not limited in this respect. For instance, the artifacts may be generated in accordance with a first technique to be compatible with a first management system based on a determination that the artifacts are to be utilized by the first management system. The artifacts may be generated in accordance with a second technique to be compatible with a second management system based on a determination that the artifacts are to be utilized by the second management system, and so on. In an example implementation, extraction logic 310 uses the compliance data model 332 to generate artifacts 334.

In accordance with an example embodiment, at least two types of artifacts are generated. Artifacts of a first type are configured to run on element managers to collect information regarding element-level aspects, including but not limited to events, settings, and reports. Artifacts of a second type are configured to use the information regarding the element-level aspects to verify respective controls and report on them. Given that there may be more than one element manager implementation, more than one type of artifact (e.g., SCOM management packs, SCCM DCM packs, etc.) may be used. Unlike conventional techniques in which specifications were read and artifacts were written by hand, the artifacts may be automatically generated from a management system-agnostic compliance data model.

At step 214, second questions regarding features of the software technology are provided. The second questions may be provided to developer(s), system(s), etc., or any combination thereof. In an example implementation, capture logic 304 provides second questions 326.

At step 216, second answers are received that correspond to the second questions. The second answers may be received from developer(s), system(s), etc., or any combination thereof. Each of the second answers may be machine-readable and/or human-readable. In an example implementation, capture logic 304 receives second answers 328 in response to the second questions 326.

At step 218, a determination is made whether the software technology includes features for satisfying the control objectives that are associated with the controls in the subset of the controls based on the second answers. In an example implementation, feature logic 312 determines whether the software technology includes features for satisfying the control objects that are associated with the controls in the subset 330 based on the second answers 328. Upon completion of step 218, flow continues to step 220, which is shown in FIG. 2B.

At step 220, a determination is made whether the software technology is missing at least one feature for satisfying at least one respective control objective that is associated with at least one respective control in the subset of the controls. If the software technology is missing at least one feature for satisfying at least one respective control objective, flow continues to step 222. Otherwise, flow continues to step 224. In an example implementation, feature logic 312 determines whether the software technology is missing at least one feature for satisfying at least one respective control objective that is associated with at least one respective control in the subset 330.

At step 222, a design change request is generated that specifies that the at least one feature is to be included in the software technology for compliance with the regulations. In an example implementation, DCR logic 316 generates design change request(s) 340, which include a design change request that specifies that the at least one feature is to be included in the software technology for compliance with the regulations 318. For example, DCR logic 316 may generate the design change request based on receipt of feature information 336 from feature logic 312. In accordance with this example, the feature information 336 may indicate that the software technology is missing the at least one feature for satisfying the at least one respective control objective.

At step 224, a determination is made whether the features that are included in the software technology are implemented in a manner that is capable of satisfying the control objectives that are associated with the controls in the subset of the controls. In an example implementation, feature logic 312 determines whether the features that are included in the software technology are implemented in a manner that is capable of satisfying the control objectives that are associated with the controls in the subset 330.

At step 226, a determination is made whether at least one of the features is implemented in a manner that is not capable of satisfying a corresponding control objective. If at least one of the features is implemented in a manner that is not capable of satisfying a corresponding control objective, flow continues to step 228. Otherwise, flow continues to step 230. In an example implementation, feature logic 312 determines whether at least one of the features is implemented in a manner that is not capable of satisfying a corresponding control objective.

At step 228, a design change request is generated that specifies that the at least one of the features is to be implemented in a manner that is capable of satisfying the corresponding control objective for compliance with the regulations. In an example implementation, DCR logic 316 generates design change request(s), which include a design change request that specifies that the at least one of the features is to be implemented in a manner that is capable of satisfying the corresponding control objective for compliance with the regulations 318. For example, DCR logic 316 may generate the design change request based on receipt of the feature information 336 from feature logic 312. In accordance with this example, the feature information 336 may indicate that the at least one of the features is implemented in a manner that is not capable of satisfying the corresponding control objective.

At step 230, a score is determined that indicates an extent to which the software technology complies with the regulations. The score is based on an extent to which the software technology includes features for satisfying the control objectives that are associated with the controls in the subset of the controls and further based on an extent to which the features are implemented in a manner that is capable of satisfying the control objectives that are associated with the controls in the subset of the controls. The score may be based on other information, as well, including but not limited to environmental factors. In an example implementation, scoring logic 314 determines a score 338 that indicates the extent to which the software technology complies with the regulations 318. For example, scoring logic 314 may determine the score 338 based on receipt of feature information 336 from feature logic 312. In accordance with this example, the feature information 336 may indicate the extent to which the software technology includes features for satisfying the control objectives that are associated with the controls in the subset 330 and/or the extent to which the features are implemented in a manner that is capable of satisfying the control objectives that are associated with the controls in the subset 330. In another example, scoring logic 314 may determine the score 338 based on receipt of other information 342 from any suitable source. In accordance with this example, scoring logic 314 may raise or lower risk ratings associated with control objectives and/or control activity parameters (e.g., password length including 8 or more characters) in a production instance of the technology.

Any one or more of steps 202, 204, 206, 208, 210, 212, 214, 216, 218, 220, 222, 224, 226, 228, and/or 230 of flowchart 200 may be performed in accordance with a common normalized schema, though the scope of the example embodiments is not limited in this respect. In some example embodiments, one or more steps 202, 204, 206, 208, 210, 212, 214, 216, 218, 220, 222, 224, 226, 228, and/or 230 may not be performed. Moreover, steps in addition to or in lieu of steps 202, 204, 206, 208, 210, 212, 214, 216, 218, 220, 222, 224, 226, 228, and/or 230 may be performed.

It will be recognized that compliance system 300 may not include one or more of control logic 302, capture logic 304, subset logic 306, modeling logic 308, extraction logic 310, feature logic 312, scoring logic 314, and/or DCR logic 316. Furthermore, compliance system 300 may include modules in addition to or in lieu of control logic 302, capture logic 304, subset logic 306, modeling logic 308, extraction logic 310, feature logic 312, scoring logic 314, and/or DCR logic 316. Moreover, capture logic 304 or a portion thereof may be implemented in management system 106 rather than compliance system 300.

Compliance system 104, management system 106, control logic 302, capture logic 304, subset logic 306, modeling logic 308, extraction logic 310, feature logic 312, scoring logic 314, DCR logic 316, and flowchart 200 may be implemented in hardware, software, firmware, or any combination thereof.

For example, compliance system 104, management system 106, control logic 302, capture logic 304, subset logic 306, modeling logic 308, extraction logic 310, feature logic 312, scoring logic 314, DCR logic 316, and/or flowchart 200 may be implemented as computer program code configured to be executed in one or more processors.

In another example, compliance system 104, management system 106, control logic 302, capture logic 304, subset logic 306, modeling logic 308, extraction logic 310, feature logic 312, scoring logic 314, DCR logic 316, and/or flowchart 200 may be implemented as hardware logic/electrical circuitry. For instance, in an embodiment, one or more of compliance system 104, management system 106, control logic 302, capture logic 304, subset logic 306, modeling logic 308, extraction logic 310, feature logic 312, scoring logic 314, DCR logic 316, and/or flowchart 200 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 4:
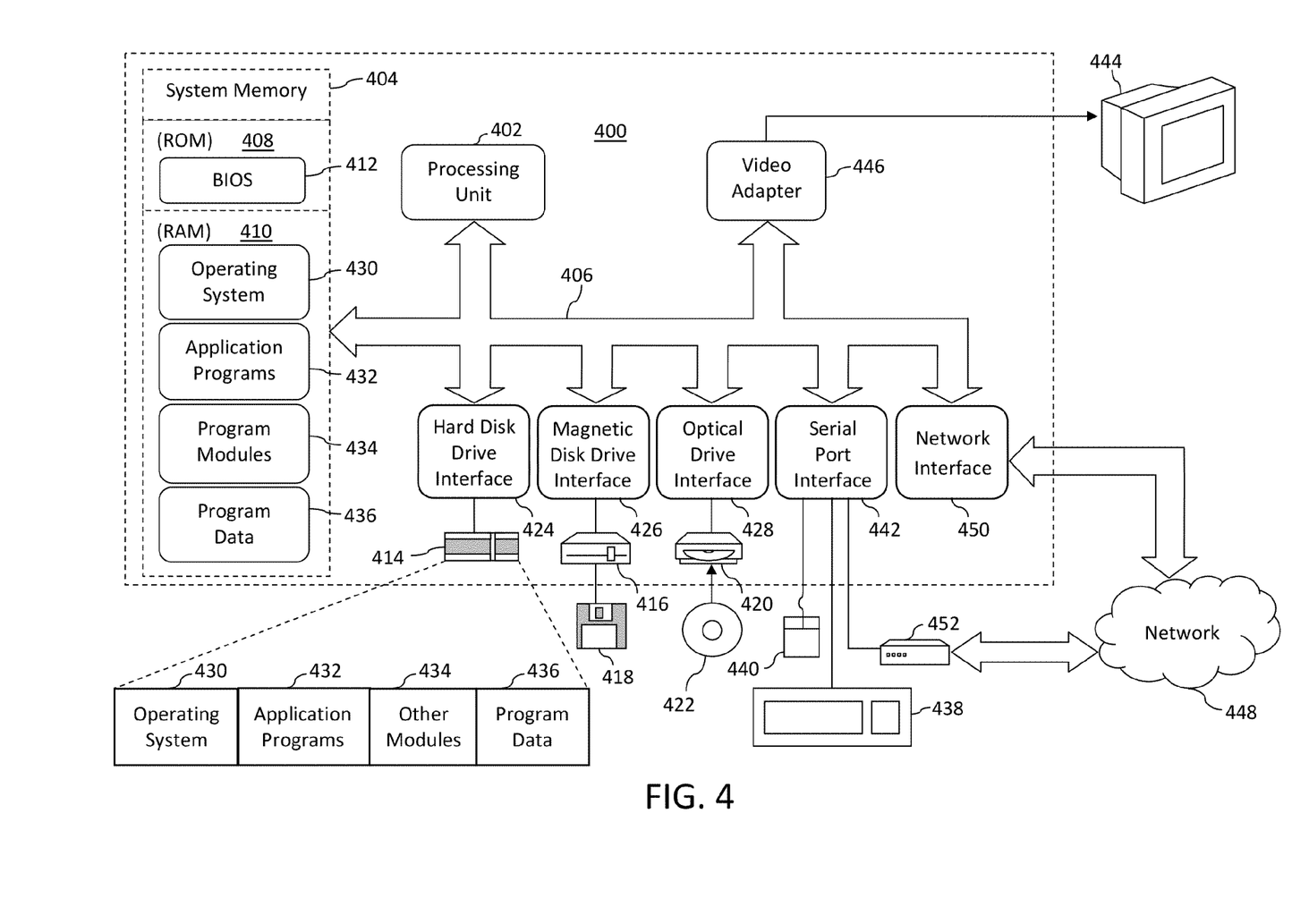
FIG. 4 depicts an example computer in which embodiments may be implemented.

FIG. 4 depicts an example computer 400 in which embodiments may be implemented. Management system 106 and/or compliance system 104 shown in FIG. 1 (or any one or more subcomponents thereof shown in FIG. 3) may be implemented using computer 400, including one or more features of computer 400 and/or alternative features. Computer 400 may be a general-purpose computing device in the form of a conventional personal computer, a mobile computer, or a workstation, for example, or computer 400 may be a special purpose computing device. The description of computer 400 provided herein is provided for purposes of illustration, and is not intended to be limiting. Embodiments may be implemented in further types of computer systems, as would be known to persons skilled in the relevant art(s).

As shown in FIG. 4, computer 400 includes a processing unit 402, a system memory 404, and a bus 406 that couples various system components including system memory 404 to processing unit 402. Bus 406 represents one or more of any of several types of bus structures, including a memory bus or memory controller, a peripheral bus, an accelerated graphics port, and a processor or local bus using any of a variety of bus architectures. System memory 404 includes read only memory (ROM) 408 and random access memory (RAM) 410. A basic input/output system 412 (BIOS) is stored in ROM 408.

Computer 400 also has one or more of the following drives: a hard disk drive 414 for reading from and writing to a hard disk, a magnetic disk drive 416 for reading from or writing to a removable magnetic disk 418, and an optical disk drive 420 for reading from or writing to a removable optical disk 422 such as a CD ROM, DVD ROM, or other optical media. Hard disk drive 414, magnetic disk drive 416, and optical disk drive 420 are connected to bus 406 by a hard disk drive interface 424, a magnetic disk drive interface 426, and an optical drive interface 428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 430, one or more application programs 432, other program modules 434, and program data 436. Application programs 432 or program modules 434 may include, for example, computer program logic for implementing compliance system 104, management system 106, control logic 302, capture logic 304, subset logic 306, modeling logic 308, extraction logic 310, feature logic 312, scoring logic 314, DCR logic 316, and/or flowchart 200 (including any step of flowchart 200), as described herein.

A user may enter commands and information into the computer 400 through input devices such as keyboard 438 and pointing device 440. Other input devices (not shown) may include a microphone, joystick, game pad, satellite dish, scanner, or the like. These and other input devices are often connected to the processing unit 402 through a serial port interface 442 that is coupled to bus 406, but may be connected by other interfaces, such as a parallel port, game port, or a universal serial bus (USB).

A display device 444 (e.g., a monitor) is also connected to bus 406 via an interface, such as a video adapter 446. In addition to display device 444, computer 400 may include other peripheral output devices (not shown) such as speakers and printers.

Computer 400 is connected to a network 448 (e.g., the Internet) through a network interface or adapter 450, a modem 452, or other means for establishing communications over the network. Modem 452, which may be internal or external, is connected to bus 406 via serial port interface 442.

As used herein, the terms "computer program medium" and "computer-readable medium" are used to generally refer to media such as the hard disk associated with hard disk drive 414, removable magnetic disk 418, removable optical disk 422, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 432 and other program modules 434) may be stored on the hard disk, magnetic disk, optical disk, ROM, or RAM. Such computer programs may also be received via network interface 450 or serial port interface 442. Such computer programs, when executed or loaded by an application, enable computer 400 to implement features of embodiments discussed herein. Accordingly, such computer programs represent controllers of the computer 400.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
generating a plurality of controls based on a plurality of regulations, each control corresponding to a respective subset of the plurality of regulations;
automatically determining a subset of the plurality of controls that is applicable to a software technology based on a first plurality of answers that corresponds to a first plurality of questions regarding intended use and implementation of the software technology, each control in the subset of the plurality of controls being associated with a control objective that specifies one or more criteria that are to be satisfied for compliance with the respective subset of the plurality of regulations, a control activity that includes instructions that specify a manner in which satisfaction of the one or more criteria that are specified by the corresponding control objective are to be satisfied, and a control activity test that includes instructions that specify a manner in which verification of satisfaction of the one or more criteria that are specified by the corresponding control objective is to be performed;
automatically generating a compliance data model regarding the software technology, the compliance data model specifying at least the control objective and the control activity test for each control in the subset of the plurality of controls; and
using the compliance data model to generate a plurality of artifacts that define a manner in which the software technology is to be executed for compliance with the plurality of regulations.

2. The method of claim 1, further comprising:
capturing and storing the first plurality of answers in a manner that is agnostic with respect to a type of extraction logic that is used to generate the plurality of artifacts.

3. The method of claim 1, wherein the plurality of artifacts includes instructions that specify that verification is to be provided regarding settings of the software technology that are configured to cause the software technology to comply with the plurality of regulations.

4. The method of claim 1, further comprising:
determining whether the software technology includes features for satisfying the control objectives that are associated with the controls in the subset of the plurality of controls based on a second plurality of answers that corresponds to a second plurality of questions.

5. The method of claim 4, further comprising:
determining whether the features are implemented in a manner that is capable of satisfying the control objectives that are associated with the controls in the subset of the plurality of controls.

6. The method of claim 5, further comprising:
determining a score that indicates an extent to which the software technology complies with the plurality of regulations based on an extent to which the software technology includes features for satisfying the control objectives that are associated with the controls in the subset of the plurality of controls and further based on an extent to which the features are implemented in a manner that is capable of satisfying the control objectives that are associated with the controls in the subset of the plurality of controls.

7. The method of claim 6, further comprising:
determining that at least one of the features is implemented in a manner that is not capable of satisfying a corresponding control objective; and
generating a design change request that specifies that the at least one of the features is to be implemented in a manner that is capable of satisfying the corresponding control objective for compliance with the plurality of regulations in response to determining that the at least one of the features is implemented in the manner that is not capable of satisfying the corresponding control objective.

8. The method of claim 4, further comprising:
determining that the software technology is missing at least one feature for satisfying at least one respective control objective that is associated with at least one respective control in the subset of the plurality of controls; and
generating a design change request that specifies that the at least one feature is to be included in the software technology for compliance with the plurality of regulations in response to determining that the software technology is missing the at least one feature.

9. The method of claim 1, wherein the compliance data model is management system-agnostic.

10. A system comprising:
control logic, implemented using at least one processor, configured to generate a plurality of controls based on a plurality of regulations, each control corresponding to a respective subset of the plurality of regulations;
subset logic configured to automatically determine a subset of the plurality of controls that is applicable to a software technology based on a first plurality of answers that corresponds to a first plurality of questions regarding intended use and implementation of the software technology, each control in the subset of the plurality of controls being associated with a control objective that specifies one or more criteria that are to be satisfied for compliance with the respective subset of the plurality of regulations, a control activity that includes instructions that specify a manner in which satisfaction of the one or more criteria that are specified by the corresponding control objective are to be satisfied, and a control activity test that includes instructions that specify a manner in which verification of satisfaction of the one or more criteria that are specified by the corresponding control objective is to be performed;
modeling logic configured to automatically generate a compliance data model regarding the software technology, the compliance data model specifying at least the control objective and the control activity test for each control in the subset of the plurality of controls; and
feature logic configured to determine whether the software technology includes features for satisfying the control objectives that are associated with the controls in the subset of the plurality of controls based on a second plurality of answers that corresponds to a second plurality of questions.

11. The system of claim 10, further comprising:
extraction logic configured to use the compliance data model to generate a plurality of artifacts that define a manner in which the software technology is to be executed for compliance with the plurality of regulations.

12. The system of claim 11, further comprising:
capture logic configured to capture and store the first plurality of answers in a manner that is agnostic with respect to a type of the extraction logic.

13. The system of claim 11, wherein the plurality of artifacts includes instructions that specify that verification is to be provided regarding settings of the software technology that are configured to cause the software technology to comply with the plurality of regulations.

14. The system of claim 10, wherein the feature logic is further configured to determine whether the features are implemented in a manner that is capable of satisfying the control objectives that are associated with the controls in the subset of the plurality of controls.

15. The system of claim 14, further comprising:
scoring logic configured to determine a score that indicates an extent to which the software technology complies with the plurality of regulations based on an extent to which the software technology includes features for satisfying the control objectives that are associated with the controls in the subset of the plurality of controls and further based on an extent to which the features are implemented in a manner that is capable of satisfying the control objectives that are associated with the controls in the subset of the plurality of controls.

16. The system of claim 15, further comprising:
design change request (DCR) logic configured to generate a design change request that specifies that at least one of the features is to be implemented in a manner that is capable of satisfying a corresponding control objective for compliance with the plurality of regulations in response to a determination that the at least one of the features is implemented in a manner that is not capable of satisfying the corresponding control objective.

17. The system of claim 10, wherein the compliance data model is management system-agnostic.

18. The system of claim 15, further comprising:
design change request (DCR) logic configured to generate a design change request that specifies that at least one feature is to be included in the software technology for compliance with the plurality of regulations in response to a determination that the software technology is missing the at least one feature for satisfying at least one respective control objective that is associated with at least one respective control in the subset of the plurality of controls.

19. A computer program product comprising a computer-readable memory having computer program logic recorded thereon for enabling a processor-based system to generate a compliance data model for information technology control, the computer program product comprising:
a first program logic module for enabling the processor-based system to generate a plurality of controls based on a plurality of regulations, each control corresponding to a respective subset of the plurality of regulations;
a second program logic module for enabling the processor-based system to automatically determine a subset of the plurality of controls that is applicable to a software technology based on a first plurality of answers that corresponds to a first plurality of questions regarding intended use and implementation of the software technology, each control in the subset of the plurality of controls being associated with a control objective that specifies one or more criteria that are to be satisfied for compliance with the respective subset of the plurality of regulations, a control activity that includes instructions that specify a manner in which satisfaction of the one or more criteria that are specified by the corresponding control objective are to be satisfied, and a control activity test that includes instructions that specify a manner in which verification of satisfaction of the one or more criteria that are specified by the corresponding control objective is to be performed;
a third program logic module for enabling the processor-based system to automatically generate a compliance data model regarding the software technology, the compliance data model specifying at least the control objective and the control activity test for each control in the subset of the plurality of controls; and
a fourth program logic module for enabling the processor-based system to use the compliance data model to generate a plurality of artifacts that define a manner in which the software technology is to be executed for compliance with the plurality of regulations.

20. The computer program product of claim 19, further comprising:
a fifth program logic module for enabling the processor-based system to determine whether the software technology includes features for satisfying the control objectives that are associated with the controls in the subset of the plurality of controls based on a second plurality of answers that corresponds to a second plurality of questions.

* * * * *